United States Patent
Raja et al.

(10) Patent No.: US 9,933,919 B2
(45) Date of Patent: Apr. 3, 2018

(54) SYSTEMS AND METHODS FOR MONITORING OPERATIONS DATA FOR MULTIPLE WELLS IN REAL-TIME

(75) Inventors: Hamayun Zafar Raja, Katy, TX (US); Syed Aijaz Rizvi, Sugar Land, TX (US)

(73) Assignee: Landmark Graphics Corporation, Houston, TX (US)

( * ) Notice: Subject to any disclaimer, the term of this patent is extended or adjusted under 35 U.S.C. 154(b) by 360 days.

(21) Appl. No.: 14/004,363

(22) PCT Filed: Mar. 10, 2011

(86) PCT No.: PCT/US2011/027911
§ 371 (c)(1),
(2), (4) Date: Nov. 20, 2013

(87) PCT Pub. No.: WO2012/121731
PCT Pub. Date: Sep. 13, 2012

(65) Prior Publication Data
US 2014/0075359 A1    Mar. 13, 2014

(51) Int. Cl.
*G06F 3/048* (2013.01)
*G06F 3/0484* (2013.01)
*E21B 44/00* (2006.01)

(52) U.S. Cl.
CPC ............ *G06F 3/0484* (2013.01); *E21B 44/00* (2013.01)

(58) Field of Classification Search
None
See application file for complete search history.

(56) References Cited

U.S. PATENT DOCUMENTS

| | | | |
|---|---|---|---|
| 6,710,788 B1* | 3/2004 | Freach | G06F 3/0481 |
| | | | 715/778 |
| 7,184,991 B1 | 2/2007 | Wentland et al. | |
| 7,857,047 B2 | 12/2010 | Remmert et al. | |
| 8,965,817 B1* | 2/2015 | Forrester | G06N 99/005 |
| | | | 706/14 |
| 2002/0103630 A1 | 8/2002 | Aldred et al. | |
| 2003/0015351 A1 | 1/2003 | Goldman et al. | |
| 2003/0074139 A1 | 4/2003 | Poedjono | |
| 2003/0139916 A1 | 7/2003 | Choe et al. | |
| 2004/0088115 A1 | 5/2004 | Guggari et al. | |
| 2005/0279532 A1 | 12/2005 | Ballantyne et al. | |
| 2007/0252717 A1* | 11/2007 | Fielder | F04D 13/10 |
| | | | 340/648 |
| 2010/0133008 A1* | 6/2010 | Gawski et al. | 175/45 |

FOREIGN PATENT DOCUMENTS

CN    1341803 A    3/2002

OTHER PUBLICATIONS

Commissioner; International Search Report and the Written Opinion of the International Searching Authority; PCT/US11/27911; May 6, 2011; 15 pgs.; ISA/US.

(Continued)

*Primary Examiner* — William Trapanese
(74) *Attorney, Agent, or Firm* — Kilpatrick Townsend & Stockton LLP (57) ABSTRACT

Systems and methods for simultaneously monitoring operations data for multiple wells in real-time using a graphical user interface.

18 Claims, 6 Drawing Sheets

(56) References Cited

OTHER PUBLICATIONS

Commissioner; International Preliminary Report on Patentability; PCT/US11/27911; Mar. 5, 2013; 6 pgs.; ISA/US.
Tran, Chau; Office Action for Canadian Patent Application No. 2,829,802; Canadian Intellectual Property Office; Jan. 29, 2015; 4 pgs.
Komaroz, A.M.; Office Action for Russian Patent Application No. 201270579/(31); The Eurasian Patent Organization; Apr. 15, 2015; 2 pgs.
Response to Office Action for Russian Patent Application No. 201270579/(31); Gorodissky & Partners; May 29, 2015; 2 pgs.
Response to Office Action for Australian Patent Application No. 2011361763; Callinans; Jul. 6, 2015; 14 pgs.
Batley, Matthew; Office Action for Australian Patent Application No. 2011361763; Australian Patent Office; Apr. 23, 2015; 4 pgs.
Chitsaka, Pascar; Office Action for Australian Patent Application No. 2011361763; Australian Patent Office; Aug. 21, 2015; 4 pgs.
Tran, Chau; Office Action for Canadian Patent Application No. 2,829,802; Canadian Intellectual Property Office; May 13, 2015; 7 pgs.
Response to Office Action for Canadian Patent Application No. 2,829,802; Norton Rose Fulbright; Jul. 10, 2015; 8 pgs.
Colin D Macauley, Response to Examination Report of Aug. 21, 2015, Australian Patent Application No. 2011361763, Sep. 30, 2015, 8 pages, Callinans, Australia.
The State Intellectual Property Office of the People's Republic of China, Notice on the First Office Action, Chinese Patent Application No. 201180069122.0, Jul. 29, 2015, 7 pages, The State Intellectual Property Office of the People's Republic of China, China.
Notice of the Second Office Action; dated Mar. 23, 2016; 16 pages; Patent Application No. 201180069122.0; State Intellectual Property Office; China.
Georgescu Mihnea; European Search Report; dated Apr. 6, 2016; 7 pages; Patent Application No. EP 11860414; EPO; Germany.
Bazhenov, Andrey; Response to Office Action; dated Jun. 9, 2016; 4 pages; Patent Application No. 201391309; Gorodissky & Partners; Moscow, Russia.
Goa, Vian; Response to Second Office Action; dated Jun. 7, 2016; 2 pages; Patent Application No. 201180069122,0; Shanghai Patent & Trademark Law Office, L.L.C.; Shanghai, China.
Baez, Fabian Ocampo; Response to Office Action; dated May 26, 2016; 2 pages; Mexican Patent Application No. MX/a/2013/010394; Uhthoff, Gomez, Vega & Uhthoff, Mexico.
Chinese Patent Application No. 201180069122.0, Third Office Action dated Sep. 26, 2016, 8 pages (including 5 pages of English Translation).
Eurasian Patent Application No. 201391309, Office Action dated Oct. 9, 2015, 5 pages (including 3 pages of English Translation).
Xu et al., "Warning Ranking for Blowout Risk of Down Hole Operation", Mar. 31, 2010, 9 pages.

* cited by examiner

SYSTEMS AND METHODS FOR MONITORING OPERATIONS DATA FOR MULTIPLE WELLS IN REAL-TIME

CROSS-REFERENCE TO RELATED APPLICATIONS

The priority of PCT Patent Application No. PCT/US2011/27911, filed on Mar. 10, 2011, is hereby claimed, and the specification thereof is incorporated herein.

STATEMENT REGARDING FEDERALLY SPONSORED RESEARCH

Not applicable.

FIELD OF THE INVENTION

The present invention generally relates to systems and methods for monitoring operations data for multiple wells in real-time. More particularly, the present invention relates to simultaneously monitoring operations data for multiple wells in real-time using a graphical user interface.

BACKGROUND OF THE INVENTION

In some fields, the ability to monitor data for activities in real-time is extremely important. Monitoring operations data, for example, in real-time during well construction activities is useful for preventing a catastrophic event and safe completion of the well.

Most conventional techniques for monitoring operations data during well construction activities, however, rely on a display that is often limited to operations data for a single activity and/or fails to correlate the relationship between the various operations data.

Figure 1:
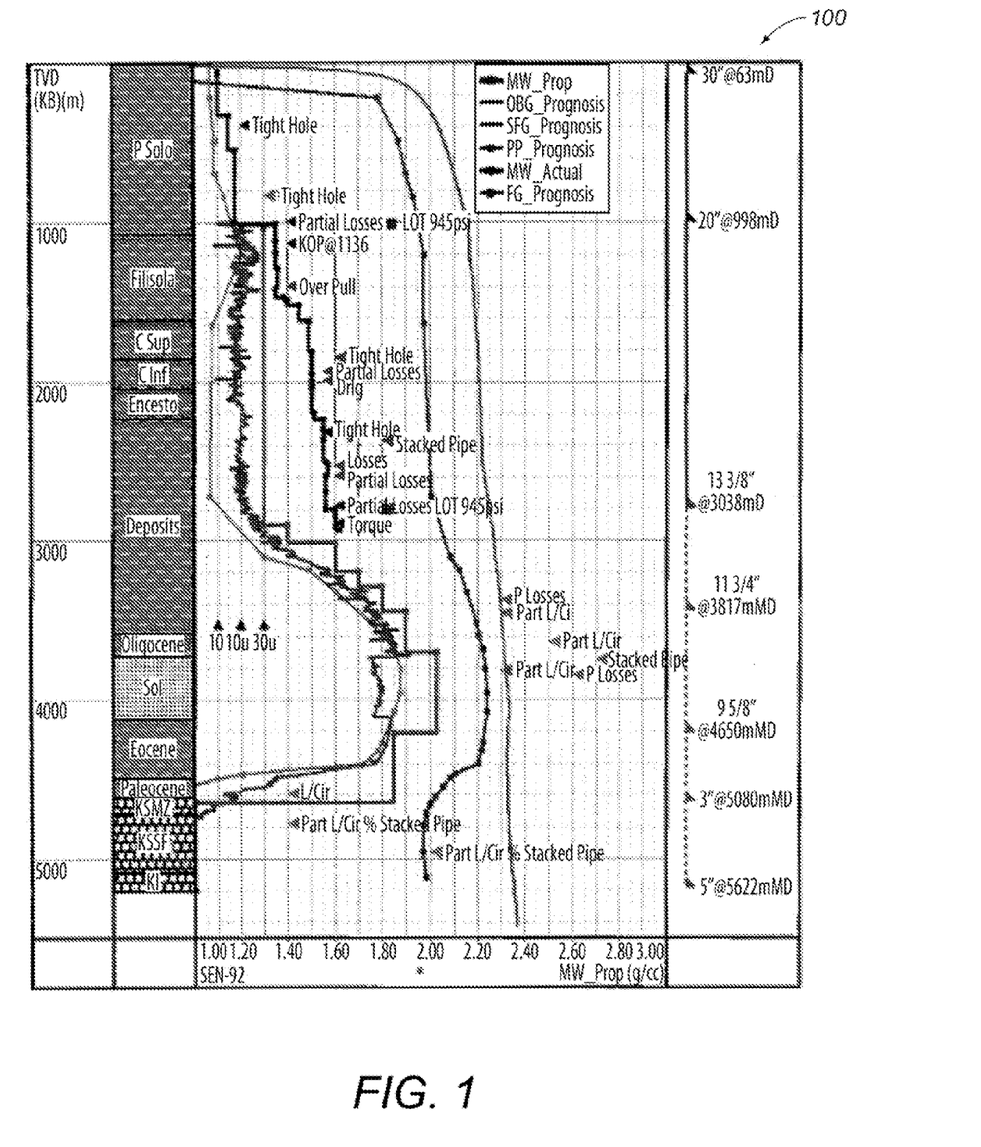
FIG. 1 illustrates a conventional display for monitoring operations data during well construction activities.

Referring now to FIG. 1, a conventional display 100 for monitoring operations data during well construction activities is illustrated. The display 100 illustrates a geo-mechanical model with a brown line, a light blue line and a dark blue line. The brown line represents pore pressure, which gives an indication of pressure contained inside the wellbore. To maintain this pressure, an equivalent amount of downhole mud weight known as equivalent circulating density or ECD, is necessary to maintain the balance of pore pressure in the wellbore. If the pore pressure is greater than the ECD, then a kick occurs. The light blue line represents mud weight and the dark blue line represents the facture gradient. If the ECD is more than the fracture gradient, then the geological formation will be fractured resulting in mud losses. Rapid mud losses can result in a stuck drillstring within the wellbore. Another line represents sheer failure, which corresponds with pack-off tendencies. Pack-off occurs when cuttings and/or cavings fall into the wellbore and the drillstring becomes stuck.

Figure 2:
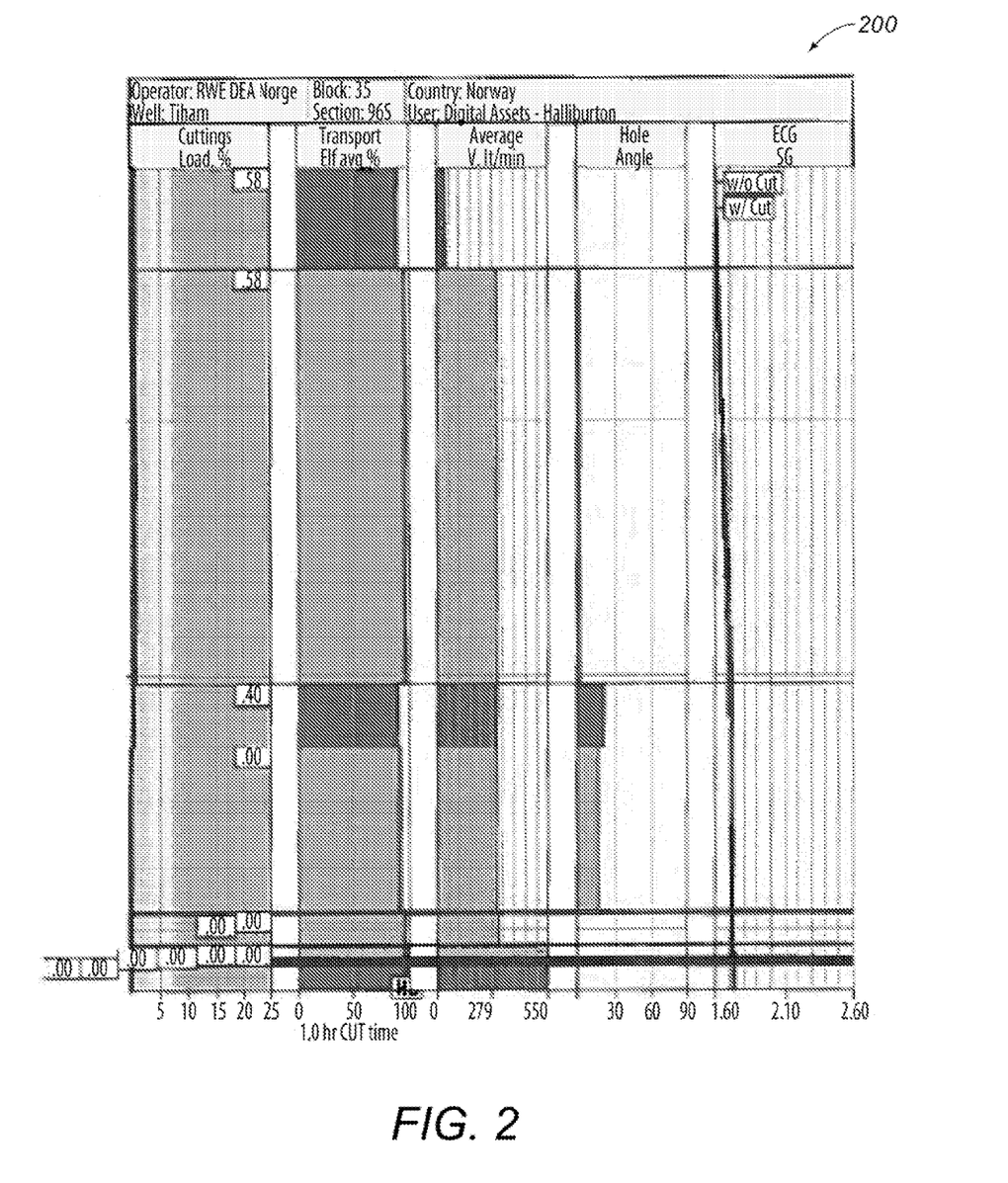
FIG. 2 illustrates another conventional display for monitoring operations data during well construction activities.

Referring now to FIG. 2, another conventional display 200 for monitoring operations data during well construction activities is illustrated. The display 200 illustrates the parameters necessary to make sure that the wellbore is properly cleaned. The first log in the display 200 represents the cutting load and transport efficiency. The next log represents the equivalent circulating density (ECD) in the wellbore. The cutting load is the amount of drill cuttings in the wellbore and transport efficiency represents how efficiently drill cuttings are being brought out of the wellbore.

Operations data that is represented in two-dimensional formats often fails to convey other essential data such as, for example, the relationships between different operations data for a well at different times relative to the construction of the well. Two-dimensional formats are particularly inefficient when attempting to obtain a global perspective of the construction of multiple wells during different activities. As a result, conventional techniques fail to permit simultaneous monitoring of operations data for multiple wells and often require a high level of oversight among multiple highly-skilled personnel to monitor operations data for multiple wells in real-time and to correlate the relationship between the real-time operations data and an engineering model. These limitations can lead to catastrophic events during well construction activities that might otherwise be prevented using a more intuitive graphical user interface to display and monitor the operations data for multiple wells in real-time.

SUMMARY OF THE INVENTION

The present invention therefore, meets the above needs and overcomes one or more deficiencies in the prior art by providing systems and methods for simultaneously monitoring operations data for multiple wells in real-time using a graphical user interface.

SUMMARY OF THE INVENTION

In one embodiment the present invention includes a method for monitoring operations data for multiple wells in real-time, comprising: i) defining a well issue and its component(s) for each well; ii) assigning a weight to each component; iii) defining one or more operations' parameters for each well issue; iv) reading real-time operations data during construction of each well using a computer processor; v) comparing an engineering model and the real-time operations data to determine a status of each well issue based upon the weight assigned to each component for the respective well issue; and vi) displaying the status of each well issue and a status of each well, wherein the status of each well is based upon a comparison of the status of each well issue for a respective well and the one or more operations' parameters for each respective well issue.

In another embodiment, the present invention includes a non-transitory program carrier device tangibly carrying computer executable instructions for monitoring operations data for multiple wells in real-time, the instructions being executable to implement: i) defining a well issue and its component(s) for each well; ii) assigning a weight to each component; iii) defining one or more operations' parameters for each well issue; iv) reading real-time operations data during construction of each well; v) comparing an engineering model and the real-time operations data to determine a status of each well issue based upon the weight assigned to each component for the respective well issue; and vi) displaying the status of each well issue and a status of each well, wherein the status of each well is based upon a comparison of the status of each well issue for a respective well and the one or more operations' parameters for each respective well issue.

In yet another embodiment, the present invention includes a non-transitory program carrier device tangibly carrying a data structure, the data structure comprising: i) a first data field comprising a three-dimensional graphical representation of an object and a status of a well issue represented on any face of the object; and ii) a second data field comprising a representation of a status of a well during a well construction activity based upon a comparison of the status of the well issue and one or more operations' parameters for the well issue.

Additional aspects, advantages and embodiments of the invention will become apparent to those skilled in the art from the following description of the various embodiments and related drawings.

BRIEF DESCRIPTION OF THE DRAWINGS

The patent application file contains at least one drawing executed in color. Copies of this patent application with color drawing(s) will be provided by the U.S. Patent and Trademark Office upon request and payment of the necessary fee.

The present invention is described below with references to the accompanying drawings in which like elements are referenced with like numerals and which.

DETAILED DESCRIPTION OF THE PREFERRED EMBODIMENTS

The subject matter of the present invention is described with specificity, however, the description itself is not intended to limit the scope of the invention. The subject matter thus, might also be embodied in other ways, to include different steps or combinations of steps similar to the ones described herein, in conjunction with other technologies. Moreover, although the term "step" may be used herein to describe different elements of methods employed, the term should not be interpreted as implying any particular order among or between various steps herein disclosed unless otherwise expressly limited by the description to a particular order. While the following description refers to the oil and gas industry, the systems and methods of the present invention are not limited thereto and may also be applied to other industries to achieve similar results.

The following systems and methods simultaneously monitor operations data for multiple wells in real-time using an intuitive graphical user interface that correlates relationships between the operations data for making fast, efficient and intuitive decisions based upon the operations data for each activity.

Method Description

Figure 3:
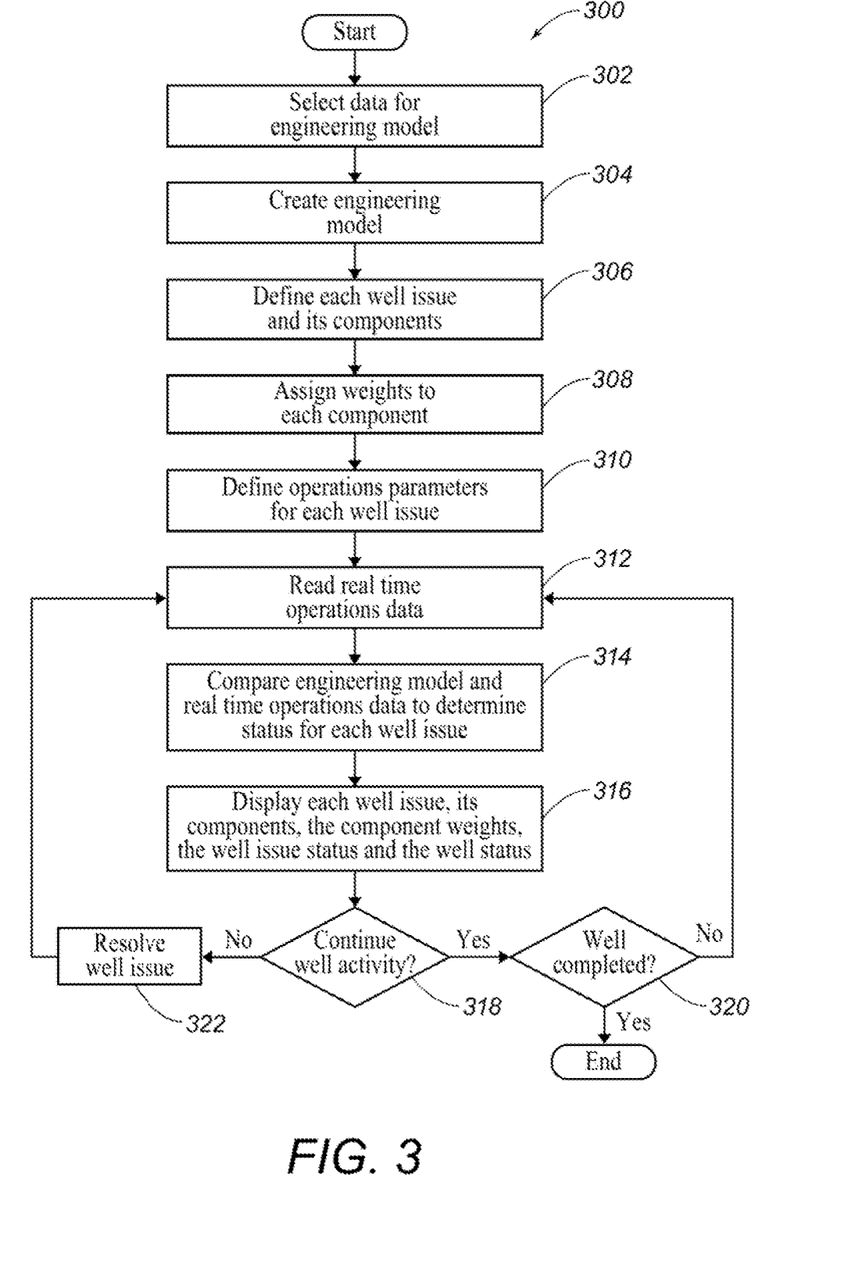
FIG. 3 is a flow diagram illustrating one embodiment of a method for implementing the present invention.

Referring now to FIG. 3, a flow diagram illustrates one embodiment of a method 300 for implementing the present invention.

Figure 5:
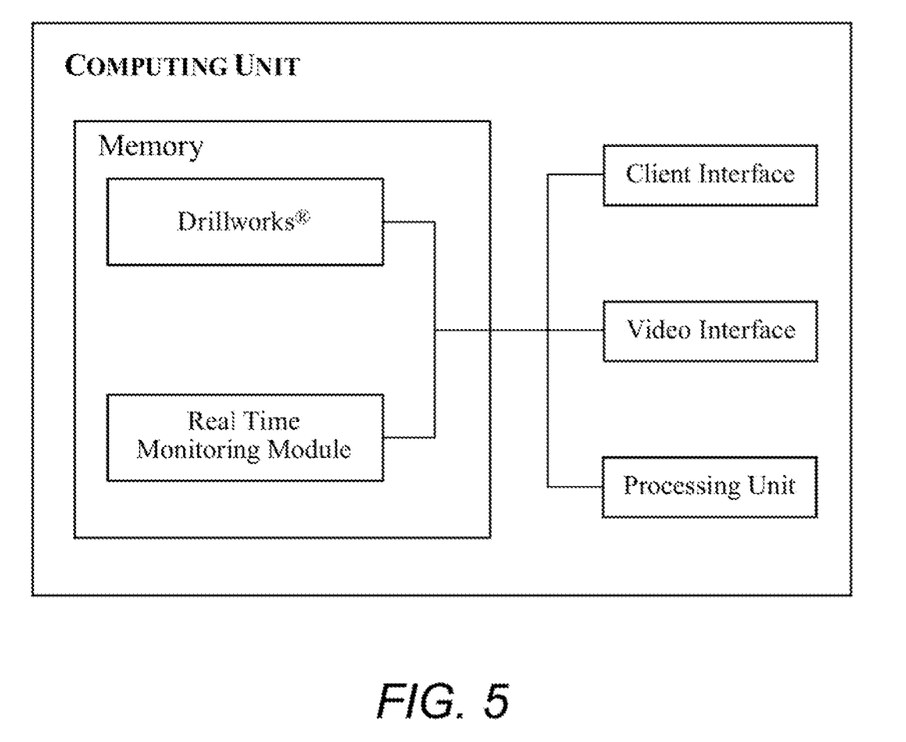
FIG. 5 is a block diagram illustrating one embodiment of a system for implementing the present invention.

In step 302, data is selected for an engineering model of a well using the client interface/video interface described in reference to FIG. 5. Data such as, for example, depth based well logging data may be selected for the engineering model, which may be displayed in the form of lines and/or logs.

In step 304, the engineering model is created using the data selected in step 302 and applications well known in the art. The engineering model may be created using Drillworks®, for example, which is a commercial software application marketed by Landmark Graphics Corporation, to model pore pressure and wellbore stability.

In step 306, each well issue and its components are defined using the client interface/video interface described in reference to FIG. 5. A well issue may be defined, for example, depending upon a particular activity during construction of the well (e.g. drilling, cementing, tripping) and will correspond with the same well issues and components represented in the engineering model. During construction of the well, for example, well issues such as well control and hole cleaning may be defined for a drilling activity. Furthermore, well issues may be defined for different activities associated with different wells. Components for each well issue may be defined such as kick, mud losses and pack-off for a well-control issue or transport efficiency, EDC and cutting load for a hole cleaning issue. Each component may be further defined by its dependency factors that determine when, for example, a kick, a mud loss or a pack-off occurs for a well control issue or when a transport efficiency, EDC or cutting load occurs for a hole cleaning issue. Each well issue may be defined by the same or different components for each well.

In step 308, a weight is assigned to each component defined in step 306 using the client interface/video interface described in reference to FIG. 5. Weights, or percentages, may be assigned to each component for each well issue based on its level of importance relative to the well issue. Well control, for example, may include kick, mud losses and pack-off components with different weights assigned to each component such as, for example, 50%, 30% and 20%, respectively. Hole cleaning, for example, may include transport efficiency, EDC, and cutting loop components with different weights assigned to each component such as, for example, 10%, 80% and 10%, respectively. The weight assigned to each component may be different than the examples provided depending upon the component, the well issue and the well. Well control, for example, may be defined by different components for one well than well control for another well and/or the components may be the same.

In step 310, operations' parameters are defined for each well issue using the client interface/video interface described in reference to FIG. 5. Operations' parameters may include, for example, conditions based on the status of the well issue such as, for example, stop, caution and continue. Well control, for example, may define operations' parameters for stop (<90%), caution (90-95%) and continue (>95%). Hole cleaning, for example, may define operations' parameters for stop (<85%), caution (85-95%) and continue (>95%). In this manner, the status of each well issue may be monitored relative to the operations' parameters to determine the status of the well. The operations' parameters may be defined in other ways and may include different conditions based on the status of the well issue.

In step 312, real-time operations data is read during construction of the well and may include, for example, operations data related to the data selected for the engineering model in step 302 and the components defined in step 306. Operations data for kick, mud losses and pack-off components may include, for example, pore pressure and mud weight. Operations data for transport efficiency, EDC and cutting load components may include, for example, the amount of drill cuttings in the well, the rate at which drill cuttings are being brought out of the well and the mud weight necessary to maintain the balance of pore pressure and wellbore stability.

In step 314, the engineering model and the real-time operations data are compared using techniques well known in the art to determine a status for each well issue. The status for each well issue may be expressed as a percentage. For example, the engineering model may be compared to real-time operations data to determine the status for well control based on whether a kick, mud loss and/or a pack-off have occurred. If one or more of these events (components) have occurred, then the status for the well issue (well control) can be determined based upon the weights assigned to each component. In the example described in reference to step 308, the status of the well issue (well control) will be 50% if a kick occurs.

In step 316, each well issue, its components, the component weights, the well issue status and the well status are displayed using the client interface/video interface described in reference to FIG. 5.

Figure 4A:
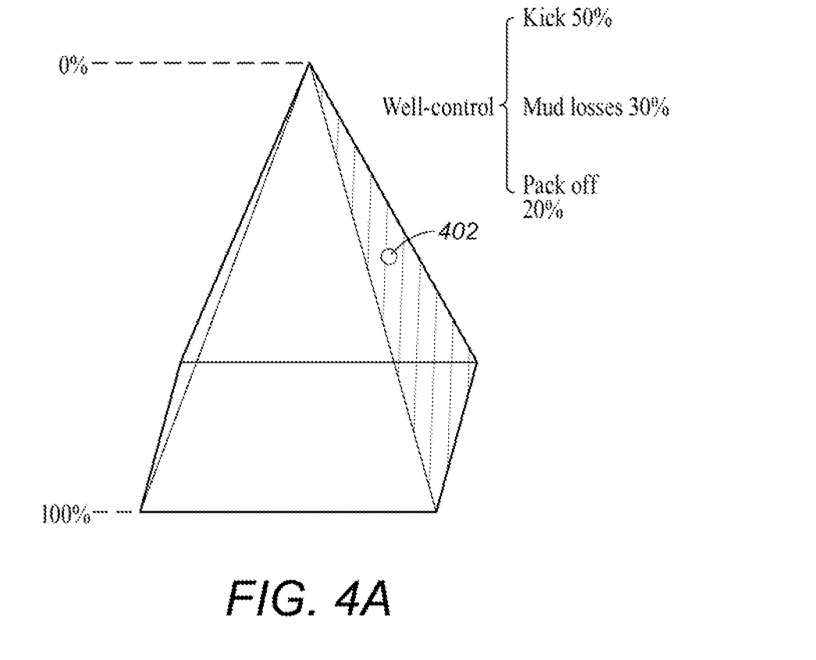
FIG. 4A illustrates an exemplary display for monitoring operations data during well construction activities according to the present invention.

In FIG. 4A, an exemplary display for monitoring operations data during well construction activities is illustrated. Well control is the well issue and its components are kick, mud losses and pack-off with weights assigned to each of 50%, 30% and 20%, respectively. The operations' parameters for this well issue are stop (<90%), caution (90-95%) and continue (>95%). Real time operations data including pore pressure and pore pressure represented in the engineering model are compared to determine the status for well control. In this example, the status for well control is 50% because a kick occurred or a mud loss and a pack-off occurred, which may be noted in the display. The well control status is represented as a point 402 between 0% and 100% and may be displayed on the face of any three-dimensional graphical representation of an object such as, for example, a pyramid in order that someone without expertise in the area or field of well control may easily and intuitively recognize the well control status. The remaining faces of the pyramid may be used to display another well issue, its components, the component weights and the another well issue status for the same well or a different well during the same well construction activity or a different well construction activity.

Figure 4B:
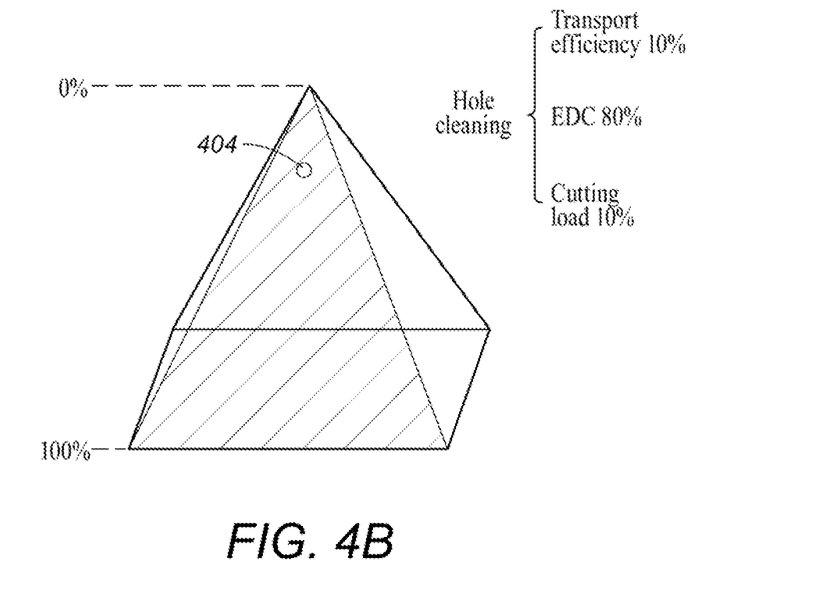
FIG. 4B illustrates another exemplary display for monitoring operations data during well construction activities according to the present invention.

In FIG. 4B, another exemplary display for monitoring operations data during well construction activities is illustrated. Hole cleaning is the well issue and its components are transport efficiency, EDC and cutting load with weights assigned to each of 10%, 80% and 10%, respectively. The operations' parameters for this well issue are stop (<85%), caution (85%-95%) and continue (>95%). Real-time operations data including pore pressure and pore pressure represented in the engineering model are compared to determine the status for hole cleaning. In this example, the status for hole cleaning is 90% because a transport efficiency occurred or a cutting load occurred, which may be noted in the display. The hole cleaning status is represented as a point 404 between 0% and 100% and may be displayed on the face of any three-dimensional graphical representation of an object such as, for example, a pyramid in order that someone without expertise in the area or field of hole cleaning may easily and intuitively recognize the hole cleaning status. The remaining faces of the pyramid may be used to display another well issue, its components, the component weights and the another well issue status for the same well or a different well during the same well construction activity or a different well construction activity.

Figure 4C:
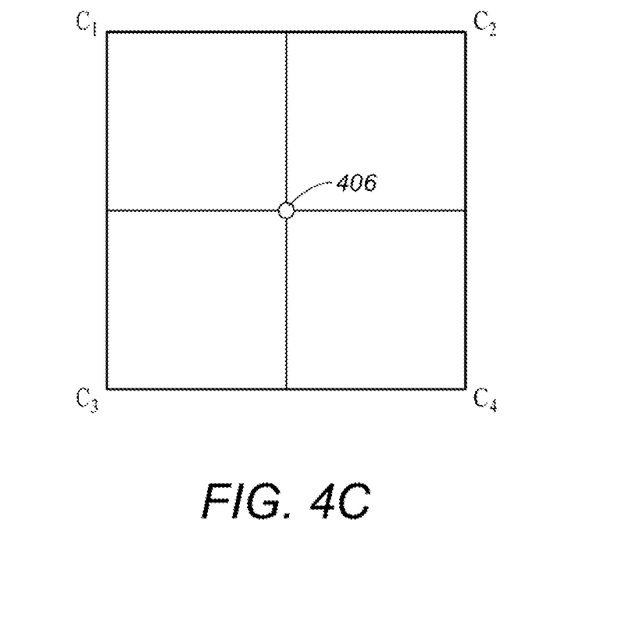
FIG. 4C illustrates another exemplary display for monitoring operations data during well construction activities according to the present invention.

In FIG. 4C, another exemplary display for monitoring operations data during well construction activities is illustrated. The base of an object such as, for example, the pyramid illustrated in FIGS. 4A and 4B may be used to optionally monitor another well issue. In this example, the well issue may represent an anticipated depth (2,000 meters) for a granite formation during construction of the well. The components for this well issue may include resistivity and gamma-ray readings. The engineering model would therefore, include the resistivity and gamma-ray readings anticipated for granite. In this example, weights are not assigned to each component. When real-time operations data including real-time resistivity and gamma-ray readings are read, they may be compared to the resistivity and gamma-ray readings in the engineering model to determine the status for the well issue. The well issue status in FIG. 4C is represented by point 406, which could confirm that the well issue has been met during construction of the well. If, for example, the granite transformation is met at a different depth, earlier or later than anticipated, then the point 406 will be centered at the depth the real-time resistivity and gamma-ray readings substantially match the resistivity and gamma-ray readings in the engineering model, and the well construction activity may be stopped to determine if the engineering model should be modified. If, however, the granite formation is met at the anticipated depth, then the point 406 will be centered at 2000 meters. Up to four components (C1-C4) may be displayed in this example for any given well issue. Various additional or alternative components may be utilized depending upon the well issue and the three-dimensional graphical representation of the object.

Figure 4D:
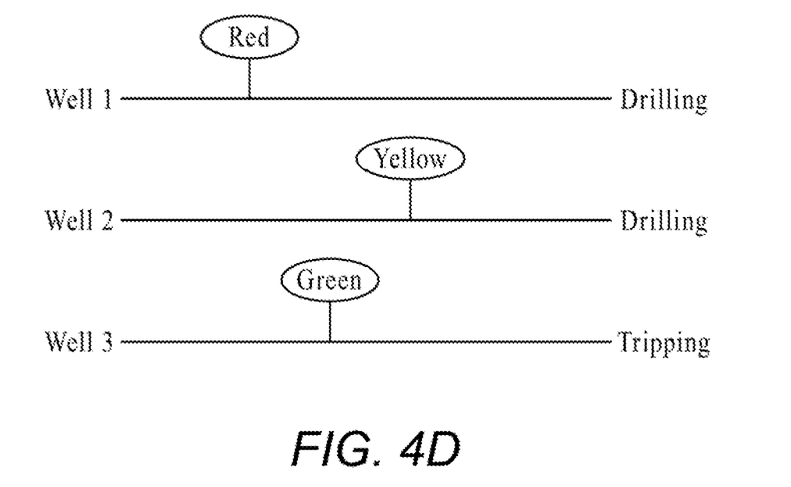
FIG. 4D illustrates an exemplary display for monitoring well status during well construction activities according to the present invention.

In step 318, the method 300 determines if the well construction activity should continue. If the well construction activity should continue, then the method 300 proceeds to step 320. If the method 300 determines that well construction activity should not continue, then the method 300 proceeds to step 322. Determining whether the well construction activity should continue may be based on the operations' parameters defined for each well issue in step 310 and/or other well known factors impacting construction of the well. In FIG. 4D, an exemplary display for monitoring well status during well construction activities is illustrated. Well 1, for example, represents a drilling activity, which may be displayed with the drilling activity for well 2 and the tripping activity for well 3 in the same display. In fact, any number of wells and corresponding well construction activities may be displayed at the same time in the same display for simultaneously monitoring operations data for multiple wells in real-time. The well status for each well illustrated in FIG. 4D may also be displayed in step 316 with each display in FIGS. 4A-4C or separately. If, for example, each display in FIGS. 4A-4C represented a different well, then the status for each respective well may be represented in the display illustrated in FIG. 4D. The status of the well issue (well control) in FIG. 4A for well 1 confirms that it is 50%. When compared to the operations' parameters defined for this well issue in step 310, the status for well 1 is displayed in FIG. 4D as red, which means stop. The well status may be displayed in text and/or color coded to correspond with the operations' parameters defined for each well issue in step 310. For example, yellow may be used for caution and green may be used for continue. Further, the status for each well displayed in FIG. 4D may be displayed along a line representing the well construction activity (e.g. drilling) at a particular point in time. If the well status for any well in FIG. 4D is red, meaning stop in this example, then all drilling activities for this well would stop either manually or automatically. In this manner, the status for multiple wells may be simultaneously monitored in order that someone with relatively little technical experience may easily and intuitively recognize and react to the status for each well displayed.

In step 320, the method 300 determines if the well is completed using techniques well known in the art and the real-time operations data read in step 312. If the method 300 determines that the well is completed (e.g. no more real-time operations data), then the method 300 ends. If the method 300 determines that the well is not completed (e.g. available real-time operations data), then the method 300 returns to step 312 and continues to read real-time operations data in the manner described until the method 300 determines that the well is completed in step 320.

In step 322, the well issue causing the well construction activity to stop in step 318 is resolved using techniques well known in the art. After the well issue is resolved, the method 300 returns to step 312 and continues to read real-time operations data in the manner described until the method 300 determines the well is completed in step 320.

System Description

The present invention may be implemented through a computer-executable program of instructions, such as program modules, generally referred to as software applications or application programs executed by a computer. The software may include, for example, routines, programs, objects, components, and data structures that perform particular tasks or implement particular abstract data types. The software forms an interface to allow a computer to react according to a source of input. Drillworks® may be used to implement the present invention. The software may also cooperate with other code segments to initiate a variety of tasks in response to data received in conjunction with the source of the received data. The software may be stored and/or carried on any variety of memory media such as CD-ROM, magnetic disk, bubble memory and semiconductor memory (e.g., various types of RAM or ROM). Furthermore, the software and its results may be transmitted over a variety of carrier media such as optical fiber, metallic wire and/or through any of a variety of networks such as the Internet.

Moreover, those skilled in the art will appreciate that the invention may be practiced with a variety of computer-system configurations, including hand-held devices, multiprocessor systems, microprocessor-based or programmable-consumer electronics, minicomputers, mainframe computers, and the like. Any number of computer-systems and computer networks are acceptable for use with the present invention. The invention may be practiced in distributed-computing environments where tasks are performed by remote-processing devices that are linked through a communications network. In a distributed-computing environment, program modules may be located in both local and remote computer-storage media including memory storage devices. The present invention may therefore, be implemented in connection with various hardware, software or a combination thereof, in a computer system or other processing system.

Referring now to FIG. 5, a block diagram illustrates one embodiment of a system for implementing the present invention on a computer. The system includes a computing unit, sometimes referred to a computing system, which contains memory, application programs, a client interface, a video interface and a processing unit. The computing unit is only one example of a suitable computing environment and is not intended to suggest any limitation as to the scope of use or functionality of the invention.

The memory primarily stores the application programs, which may also be described as program modules containing computer-executable instructions, executed by the computing unit for implementing the present invention described herein and illustrated in FIGS. 3 and 4A-4D. The memory therefore, includes a real-time monitoring module, which enables the methods illustrated and described in reference to FIG. 3 and integrates functionality from the remaining application programs illustrated in FIG. 5. In particular, Drillworks® may be used to execute the functions described in reference to steps 302, 304 and 312 in FIG. 3 while the real-time monitoring module is used to execute the functions described in reference to steps 306, 308, 310, 314, 316, 318, 320 and 322 in FIG. 3.

Although the computing unit is shown as having a generalized memory, the computing unit typically includes a variety of computer readable media. By way of example, and not limitation, computer readable media may comprise computer storage media. The computing system memory may include computer storage media in the form of volatile and/or nonvolatile memory such as a read only memory (ROM) and random access memory (RAM). A basic input/output system (BIOS), containing the basic routines that help to transfer information between elements within the computing unit, such as during start-up, is typically stored in ROM. The RAM typically contains data and/or program modules that are immediately accessible to and/or presently being operated on by the processing unit. By way of example, and not limitation, the computing unit includes an operating system, application programs, other program modules, and program data.

The components shown in the memory may also be included in other removable/non-removable, volatile/non-volatile computer storage media or they may be implemented in the computing unit through application program interface ("API"), which may reside on a separate computing unit connected through a computer system or network. For example only, a hard disk drive may read from or write to non-removable, nonvolatile magnetic media, a magnetic disk drive may read from or write to a removable, nonvolatile magnetic disk, and an optical disk drive may read from or write to a removable, nonvolatile optical disk such as a CD ROM or other optical media. Other removable/non-removable, volatile/non-volatile computer storage media that can be used in the exemplary operating environment may include, but are not limited to, magnetic tape cassettes, flash memory cards, digital versatile disks, digital video tape, solid state RAM, solid state ROM, and the like. The drives and their associated computer storage media discussed above provide storage of computer readable instructions, data structures, program modules and other data for the computing unit.

A client may enter commands and information into the computing unit through the client interface, which may be input devices such as a keyboard and pointing device, commonly referred to as a mouse, trackball or touch pad. Input devices may include a microphone, joystick, satellite dish, scanner, or the like. These and other input devices are often connected to the processing unit through a system bus, but may be connected by other interface and bus structures, such as a parallel port or a universal serial bus (USB).

A monitor or other type of display device may be connected to the system bus via an interface, such as a video interface. A graphical user interface ("GUI") may also be used with the video interface to receive instructions from the client interface and transmit instructions to the processing unit. In addition to the monitor, computers may also include other peripheral output devices such as speakers and printer, which may be connected through an output peripheral interface.

Although many other internal components of the computing unit are not shown, those of ordinary skill in the art will appreciate that such components and their interconnection are well known.

While the present invention has been described in connection with presently preferred embodiments, it will be understood by those skilled in the art that it is not intended to limit the invention to those embodiments. It is therefore, contemplated that various alternative embodiments and modifications may be made to the disclosed embodiments without departing from the spirit and scope of the invention defined by the appended claims and equivalents thereof.

The invention claimed is:

1. A computer-implemented method for monitoring operations data for multiple wells in real-time, comprising:
   defining a well issue for each well, the well issue being associated with an event;
   assigning a weight to the event;
   defining one or more operations' parameters for the well issue, the one or more operations' parameters including a condition for performing an action;
   reading, by a processor, real-time operations data during construction of each well;
   comparing an engineering model and the real-time operations data to determine a status of the well issue, the status of the well issue being based upon an occurrence of the event and the weight assigned to the event; and
   displaying the status of the well issue and a status of each well using a three-dimensional graphical representation of an object, the object having a plurality of faces, and the status of the well issue being represented by a face of the plurality of faces, wherein the status of each well is based upon a comparison of the status of the well issue and the condition of the one or more operations' parameters.

2. The method of claim 1, further comprising determining whether to continue construction of each well based upon the status of each well and the status of each well issue for a respective well.

3. The method of claim 2, further comprising determining whether each well is completed based upon reading real-time operations data during construction of each well.

4. The method of claim 2, further comprising resolving each well issue for a respective well when the construction of the respective well is discontinued.

5. The method claim 1, wherein the well issue is well control and the event includes kick, mud losses or pack-off.

6. The method of claim 1, wherein the one or more operations' parameters for each well issue comprise stop, caution and continue.

7. A non-transitory program carrier device tangibly carrying computer executable instructions for monitoring operations data for multiple wells in real-time, the instructions being executable to implement:
   defining a well issue for each well, the well issue being associated with an event;
   assigning a weight to the event;
   defining one or more operations' parameters for the well issue, the one or more operations' parameters including a condition for performing an action;
   reading real-time operations data during construction of each well;
   comparing an engineering model and the real-time operations data to determine a status of the well issue, the status of the well issue being based upon an occurrence of the event and the weight assigned to the event; and
   displaying the status of the well issue and a status of each well using a three-dimensional graphical representation of an object, the object having a plurality of faces, each the status of the well issue being represented by a face of the plurality of faces, wherein the status of each well is based upon a comparison of the status of the well issue and the condition of the one or more operations' parameters.

8. The program carrier device of claim 7, further comprising determining whether to continue construction of each well based upon the status of each well and the status of each well issue for a respective well.

9. The program carrier device of claim 8, further comprising determining whether each well is completed based upon reading real-time operations data during construction of each well.

10. The program carrier device of claim 8, further comprising resolving each well issue for a respective well when the construction of the respective well is discontinued.

11. The program carrier device claim 7, wherein the well issue is well control and the event includes kick, mud losses or pack-off.

12. The program carrier device of claim 7, wherein the one or more operations' parameters for each well issue comprise stop, caution and continue.

13. A non-transitory program carrier device tangibly carrying a data structure, the data structure comprising:
   a first data field comprising a three-dimensional graphical representation of an object having a plurality of faces, and each face of the plurality of faces representing a status of a well issue associated with a well; and
   a second data field comprising a representation of a real-time status of the well during a well construction activity, the real-time status of the well being based upon a comparison of the status of the well issue and one or more operations' parameters for the well issue.

14. The program carrier device of claim 13, further comprising a third data field, the third data field comprising another three-dimensional graphical representation of the object or another object and a status of another well issue represented on any face of the object or the another object.

15. The program carrier device of claim 14, further comprising a fourth data field, the fourth data field comprising a representation of a status of another well during another well construction activity based upon a comparison of the status of the another well issue and one or more operations' parameters for the another well issue.

16. The program carrier device of claim 13, wherein the object is a pyramid.

17. The program carrier device of claim 16, further comprising a third data field, the third data field comprising a status of another well issue represented on a base of the object.

18. The program carrier device of claim 13, wherein the one or more operations' parameters for the well issue are stop, caution and continue.

* * * * *